Patented Sept. 18, 1934

1,974,311

UNITED STATES PATENT OFFICE 1,974,311

TREATMENT OF HYDROCARBON OILS

Ime Levine, Chicago, Ill., assignor to Universal Oil Products Company, Chicago, Ill., a corporation of South Dakota No Drawing. Application June 26, 1931, Serial No. 547,190

4 Claims. (Cl. 196—36)

This invention relates to the treatment of hydrocarbon oils and is especially applicable to the treatment of cracked hydrocarbon distillates produced by the conversion of relatively high boiling hydrocarbons into more valuable low boiling hydrocarbons.

Petroleum distillates, particularly cracked hydrocarbon distillates, contain objectionable color and gum forming components which render the distillate unmarketable if improperly refined. In addition, many petroleum distillates contain objectionable amounts of sulphur which cause corrosion of the crankcase and other parts of an internal combustion engine when employed as a motor fuel. Among the specific objects of the invention is the elimination or reduction of the sulphur compounds in the hydrocarbons undergoing treatment.

In a specific embodiment the invention consists in treating hydrocarbons, preferably in vaporous form, with an aldehyde, examples of which are formaldehyde and acetaldehyde in combination with a condensing agent such as zinc chloride, hydrochloric acid or the like.

The essence of my process resides in desulphurizing the hydrocarbons by the use of an aldehyde while in the presence of a condensing agent which may simultaneously have refining properties. In the present instance, the condensing agents are metallic chlorides such as the chlorides of tin, zinc, antimony, aluminum as such or made in situ from hydrochloric acid and a metal and the like, and for the present purpose the refining properties of these substances may be purely incidental. The presence of the metallic chloride, zinc chloride, aluminum chloride, etc. or similar condensing agent is necessary to cause the aldehyde to combine and react with sulphur compounds, thus causing their removal.

In carrying out the process of the invention the oil vapors to be treated from any source such as from a cracking unit, distillation unit, and the like, is contacted with the refining agent such as hydrochloric acid and a metal, a solution of zinc chloride or other metallic chloride, or the like, simultaneously treating the oil vapors with an aldehyde such as formaldehyde or acetaldehyde. Many forms of equipment and apparatus may be used in applying the process of the invention provided they meet the essential requirement that the hydrocarbon vapors are efficiently contacted with the aldehyde and the condensing agent. For example a packed tower containing an inert or reactive substance such as a metal when hydrochloric acid is employed, may be utilized, passing the hydrocarbon vapors upwardly, introducing the aldehyde together with the condensing reagent such as a solution of zinc chloride in the vapor line entering the tower or column. When solutions such as zinc chloride are employed as the condensing agent, they are preferably passed countercurrent to the flow of the hydrocarbons and aldehydes, which are usually in vaporous form, under the conditions existing in the treating tower.

The aldehydes combine with the sulphur compounds under the influence of the condensing agent, generally forming higher boiling compounds which may be removed with the reflux condensate from the fractionating column. The sulphur compounds so condensed are thus prevented from passing into the overhead distillate and the percent of sulphur therein is substantially reduced.

As an example of the results obtained by the operation of my invention, a California cracked distillate is vaporized and subjected to treatment with approximately the equivalent of about one pound per barrel of a concentrated solution of zinc chloride. Approximately 2% of formaldehyde by weight of the oil to be treated is fed into the vapor line, entering the treating tower simultaneously with the treating reagent and the hydrocarbon vapors. The untreated condensed hydrocarbons contain approximately 0.6% of sulphur. The color of the distillate is yellow and it has a gum content of approximately 400 mgs. per 100 cc. by the copper dish method. The treated distillate is approximately 30 in color, has a gum content of approximately 35 mgs. per 100 cc., and the sulphur may be reduced to approximately 0.1%.

Similar results have been obtained with other cracked distillate containing sulphur compounds, the conditions of treatment and amounts of treating materials being varied depending upon the results desired.

I claim as my invention:

1. A process for refining cracked hydrocarbon distillates which comprises subjecting said distillate to the action of an aldehyde having the character and action of formaldehyde and acetaldehyde in the presence of hydrochloric acid and a metal capable of reacting with the acid to form a chloride condensing agent.

2. A process for refining cracked hydrocarbon distillates which comprises subjecting said distillate in heated vaporous condition to the action of an aldehyde having the character and action of a formaldehyde and acetaldehyde in the presence of hydrochloric acid and a metal capable of reacting with the acid to form a chloride condensing agent.

3. A process for refining cracked hydrocarbon distillates which comprises subjecting said distillate in heated vaporous condition to the action of an aldehyde in vaporous form in the presence of hydrochloric acid and a metal capable of reacting with the acid to form a chloride condensing agent, said aldehyde having the character and action of formaldehyde and acetaldehyde.

4. A process for refining cracked hydrocarbon distillates which comprises subjecting said distillate in heated vaporous condition to the action of an aldehyde having the character and action of formaldehyde and acetaldehyde in the presence of zinc and hydrochloric acid.

IME LEVINE.